(12) United States Patent
Chennakeshu et al.

(10) Patent No.: US 7,099,410 B1
(45) Date of Patent: *Aug. 29, 2006

(54) REDUCED COMPLEXITY MLSE EQUALIZER FOR M-ARY MODULATED SIGNALS

(75) Inventors: Sandeep Chennakeshu, Cary, NC (US); Kambiz Zangi, Raleigh, NC (US); Gregory E. Bottomley, Cary, NC (US)

(73) Assignee: Ericsson Inc., Plano, TX (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/237,356

(22) Filed: Jan. 26, 1999

(51) Int. Cl.
*H04L 27/06* (2006.01)

(52) U.S. Cl. ...................................... 375/341

(58) Field of Classification Search ................ 375/224, 375/229, 230, 231, 232, 233, 235, 341, 340, 375/316; 455/130; 329/304; 370/310
See application file for complete search history.

(56) References Cited

U.S. PATENT DOCUMENTS

| | | | |
|---|---|---|---|
| 5,091,918 A | | 2/1992 | Wales |
| 5,131,011 A | | 7/1992 | Bergmans et al. |
| 5,440,588 A | | 8/1995 | Murakami |
| 5,481,572 A | | 1/1996 | Sköld et al. |
| 5,488,635 A | * | 1/1996 | Chennakeshu et al. ..... 375/340 |
| 5,499,272 A | | 3/1996 | Bottomley |
| 5,673,294 A | * | 9/1997 | Namekata .................. 375/341 |
| 5,680,419 A | | 10/1997 | Bottomley |
| 5,949,796 A | * | 9/1999 | Kumar ....................... 370/487 |
| 6,108,517 A | * | 8/2000 | Arslan et al. ............... 229/217 |

OTHER PUBLICATIONS

"Decision Feedback Sequence Estimation for Continuous Phase Modulation On a Linear Multipath Channel", *IEEE Transactions on Communications*, vol. 41, No. 2, Feb. 1993.

* cited by examiner

*Primary Examiner*—Pankaj Kumar

(57) ABSTRACT

The present invention involves demodulation of radio signals modulated with M-ary modulation in the presence of intersymbol interference distortion. The invention presents a method for reducing the number of multiplications needed to implement a maximum-likelihood-sequence-estimation (MLSE) equalizer for signals modulated with M-ary modulation. In exemplary embodiments of the present invention, the number of multiplications is reduced by pre-computing certain values needed for the determination of the branch metric and storing these pre-computed values in a product table. When a branch metric computation is to be made, whether it is an Euclidean branch metric computation or an Ungerboeck branch metric computation, certain multiplication operations are replaced by simple table look-up operations. As a result, the power efficiency and speed of the system are increased. Any receiver that demodulates signals that are modulated with M-ary modulation can be implemented using the present invention. The resulting demodulator will have a lower complexity than existing demodulators.

12 Claims, 11 Drawing Sheets

|  | c(n) | | | | |
|---|---|---|---|---|---|
| $S_n$ | | | | | |
| c(0)B(1) | c(1)B(1) | ● | ● | ● | c(Nt-1)B(1) |
| c(0)B(2) | c(1)B(2) | ● | ● | ● | c(Nt-1)B(2) |
| | | ● | | | |
| | | ● | | | |
| | | ● | | | |
| c(0)B(M) | c(1)B(M) | ● | ● | ● | c(Nt-1)B(M) |

| q(0)B(1) | q(1)B(1) | • | • | • | q(Nt-1)B(1) |
|---|---|---|---|---|---|
| q(0)B(2) | q(1)B(2) | • | • | • | q(Nt-1)B(2) |
| | | | • | | |
| | | | • | | |
| | | | • | | |
| q(0)B(M) | q(1)B(M) | • | • | • | q(Nt-1)B(M) |

REDUCED COMPLEXITY MLSE EQUALIZER FOR M-ARY MODULATED SIGNALS

BACKGROUND

Digital wireless communication systems are used to convey a variety of information between multiple locations. With digital communications, information is translated into a digital or binary form, referred to as bits, for communication purposes. The transmitter maps this bit stream into a modulated symbol stream, which is detected at the digital receiver and mapped back into bits and information.

In digital communications, the radio environment presents many difficulties that impede successful communications. One difficulty is that the signal level can fade because the signal may travel in multiple paths. As a result, signal images may arrive at the receiver antenna out of phase. This type of fading is commonly referred to as Rayleigh fading or fast fading. When the signal fades, the signal-to-noise ratio becomes lower, causing degradation in the quality of the communication link.

A second problem occurs when the multiple signal paths are much different in length. In this case, time dispersion occurs, in which multiple fading signal images arrive at the receiver antenna at different times, thus giving rise to signal echoes or rays. This causes intersymbol interference (ISI), where the echoes of one symbol interfere with subsequent symbols.

At the receiver, coherent demodulation is desirable, since it provides the best performance. This requires knowledge of the multipath channel. In many wireless applications, this channel is time-varying, due to transmitter motion, receiver motion, and/or scatterer motion. Thus, there is a need to track a time varying multipath channel.

To provide coherent demodulation of multipath signals, a maximum-likelihood-sequence-estimation (MLSE) equalizer may be employed. Such an equalizer considers various hypotheses for the transmitted symbol sequence, and with a model of the dispersive channel, determines which hypothesis best fits the received data. This is efficiently realized using the Viterbi algorithm. This equalization technique is well known to those skilled in the art, and can be found in J. C. Proakis, Digital Communications, 1989.

The conventional MLSE equalizer can be explained by a simple example. Suppose the transmitter transmits a symbol stream s(n), which takes on values "+B" or "−B" corresponding to bit values 0 or 1, respectively. This stream is modulated using binary-shift keying (BPSK). At the receiver, the received signal is filtered, amplified, and mixed down using the I and Q carriers, then sampled once every symbol period (T), giving a received signal stream r(n). In this example, the intervening channel consists of two rays, a main ray and an echo, where the echo arrives T seconds later and T is the symbol period. Then the received signal can be modeled as $$r(n) = c_0 s(n) + c_1 s(n-1) + \eta(n), \quad (1)$$

where $c_0$ and $c_1$ are complex channel tap values and $\eta(n)$ is additive noise or interference.

In the MLSE equalizer, at iteration n, there would be two different previous "states," 0 and 1, corresponding to the two possible values for the previous symbols:

1. $s(n-1) = B \leftrightarrow$ Previous State=0
2. $s(n-1) = -B \leftrightarrow$ Previous State=1.

Associated with each previous state there would be an accumulated metric, accumulated from previous iterations, giving rise to accumulated metrics $A_0(n-1)$ and $A_1(n-1)$ for previous state 0 and previous state 1, respectively.

There would also be two current states corresponding to two possible values for s(n). Each possible pairing of a previous state with a current state corresponds to a hypothetical sequence $\{s_h(n-1), s_h(n)\}$. For each of these hypotheses, there will be a corresponding hypothesized received signal value at time n:

$$r_h(n) = c_0 s_h(n) + c_1 s_h(n-1) \quad (2)$$

Furthermore, for each of these hypotheses, there will be a corresponding "branch" metric given by $$M_h(n) = |r(n) - r_h(n)|^2. \quad (3)$$

In the example, there are four possible hypothetical sequences which can be denoted by $h \in \{00, 01, 10, 11\}$, as illustrated in Table 1.

TABLE 1

| Naming Convention for States | | |
|---|---|---|
| Previous State | Current State | h |
| 0(B) | 0(B) | 00 |
| 1(−B) | 0(B) | 10 |
| 0(B) | 1(−B) | 01 |
| 1(−B) | 1(−B) | 11 |

The candidate metrics for each possible current state would be the sum of the corresponding-branch metrics and the previously accumulated metric associated with $s_h(n-1)$. For each current state, there are two possible previous states. For each current state, the previous state which gives the smallest candidate metric is selected as the predecessor state, and the candidate metric becomes the accumulated metric for that current state.

Thus, for current state 0 (i.e., s(n)=B), there will be two hypothetical sequences $\{s_h(n-1)=B, s_h(n)=B\}$ or $\{s_h(n-1)=-B, s_h(n)=B\}$, denoted by hypotheses h=00 and h=10. This gives rise to two candidate metrics for current state 0:

$$C_{00}(n) = A_0(n-1) + M_{00}(n) \quad (4)$$

$$C_{10}(n) = A_1(n-1) + M_{10}(n). \quad (5)$$

The smaller of these two candidate metrics gives the accumulated metric for current state 0. The corresponding previous state becomes the predecessor state to state 0 at time n:

1. If $C_{10}(n) < C_{00}(n)$, $A_0(n) = C_{10}(n)$
2. If $C_{00}(n) < C_{10}(n)$, $A_0(n) = C_{00}(n)$

A similar procedure is applied to current state 1 (i.e., s(n)=−B), in which case the two hypotheses are h=01 and h=11.

For each n, four hypothesized received signal values must be computed according to equation (2). Computing each hypothesized value $r_h(n)$ involves two multiplication operations. Each of these multiplication operations involves the product of one of the channel taps and a hypothetical symbol value.

If B is set to +1, the multiplications become simply sign changes. However, if amplitude modulation is used, this is not possible. Also, suppose symbol values can be normalized to $$\left\{ e^{j\frac{2\pi}{8}l} \right\}_{l=0}^{7}$$

(i.e., 8PSK modulation). In this case, the necessary multiplications can not be implemented as simple sign changes.

One way to increase the throughput over a digital channel is to allow each transmitted symbol to take on more than two values. In general, each symbol might be chosen from a set of M possible values $\{B_1, B_2, \ldots, B_M\}$ thereby increasing the number of bits per symbol. The complexity of the conventional implementation of the MLSE equalizer increases exponentially with the number of allowed symbols (i.e., with M). Specifically, with "L" channel taps, the number of multiplications needed for the conventional implementation of the equalizer is proportional (proportionality constant greater than one) to $M^{L-1}$.

Even with moderate values for M and L (e.g., 8 and 5 respectively), it is impractical to implement the equalizer in grand purpose DSPs with low power consumption. The trend in power sensitive applications is to move away from DSPs toward ASICs. ASICs can be optimized for performing one task with low power consumption and small size (i.e., small gate count). Implementing multipliers in an ASIC is much more expensive (in terms of power consumption and gate count) than implementing circuits for addition or subtraction. Therefore, it is highly desirable to avoid many of the multiplications associated with the conventional implementation of MLSE equalizers.

Because of the trend toward increasing the number of required multiplication operations and due to the fact that technology is moving away from DSPs, where multiplication operations are easy, toward ASICs, where multiplications are relatively expensive, it is desirable to reduce the number of multiplications actually performed by the MLSE.

SUMMARY

This disclosure concerns demodulation of radio signals modulated with M-ary modulation in the presence of intersymbol interference distortion. The invention presents a method for reducing the number of multiplications needed to implement an MLSE equalizer for signals modulated with M-ary modulation.

In exemplary embodiments of the present invention, the number of multiplications is reduced by pre-computing certain values needed for the determination of the branch metric and storing these pre-computed values in a product table. When a branch metric computation is to be made, whether it is an Euclidean branch metric computation or an Ungerboeck branch metric computation, certain multiplication operations are replaced by simple table look-up operations. As a result, the power consumption and size of the equalizer are reduced.

Any receiver that demodulates signals that are modulated with M-ary modulation can be implemented using the instant invention. The resulting demodulator will have a lower complexity than existing demodulators.

BRIEF DESCRIPTION OF THE DRAWINGS

The above objects and features of the present invention will be more apparent from the following description of the preferred embodiments with reference to the accompanying drawings, wherein:

FIG. 6 illustrates a product table for the Euclidean metric according to one embodiment of the present invention;

FIG. 10 illustrates a product table for the Ungerboeck metric according to one embodiment of the present invention.

DETAILED DESCRIPTION

Figure 1:
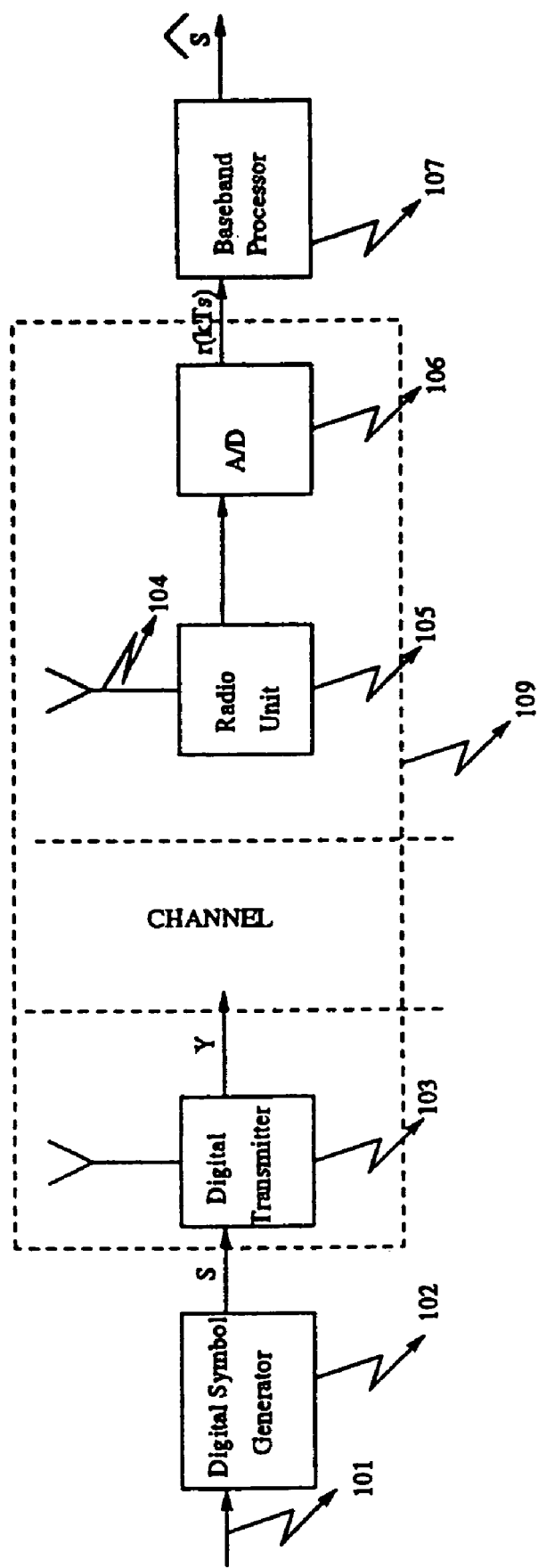
FIG. 1 illustrates a radio communication system within which the techniques according to the present invention can be implemented.

FIG. 1 illustrates a radio communication system within which the present invention may be implemented. In FIG. 1, a radio transmitter and receiver for a radio communication system are provided. The radio communication system may operate using FDMA, TDMA, or CDMA, or some combination thereof. A transmitter has a digital symbol generator 102 which receives an information carrying signal 101 and generates a corresponding digital symbol sequence, S. The symbols S are subjected to digital-to-analog (D/A) conversion, modulation, pulse shape filtering and amplification, and are transmitted as analog signal Y by digital transmitter 103 according to known techniques.

Signal Y travels through the radio channel and is intercepted by the antenna 104 at the receiver. Thermal noise n is also intercepted by the antenna 104.

Radio unit 105 amplifies, down-converts, and filters the received signal according to known methods to produce an analog output. This analog output is coupled to an A/D converter 106 which converts the analog signal into a received signal sample stream $r(kT_s)$, where $T_s$ is the sample period, and k is an integer counter. The sampling period $T_s$ may be less than the symbol period T. The received signal sample streams are collected in processor 107, which processes this stream to produce an estimate of the transmitted digital symbol stream $\hat{S}$. In later descriptions, transmission function 109 is used to refer to the signal path through digital transmitter 103, the radio transmission channel 105, and A/D 106 collectively.

The transmission function 109 produces the received signal sample stream $r(kT_s)$ which is sent to processing unit 107 where it is processed in accordance with the present invention.

Figure 2:
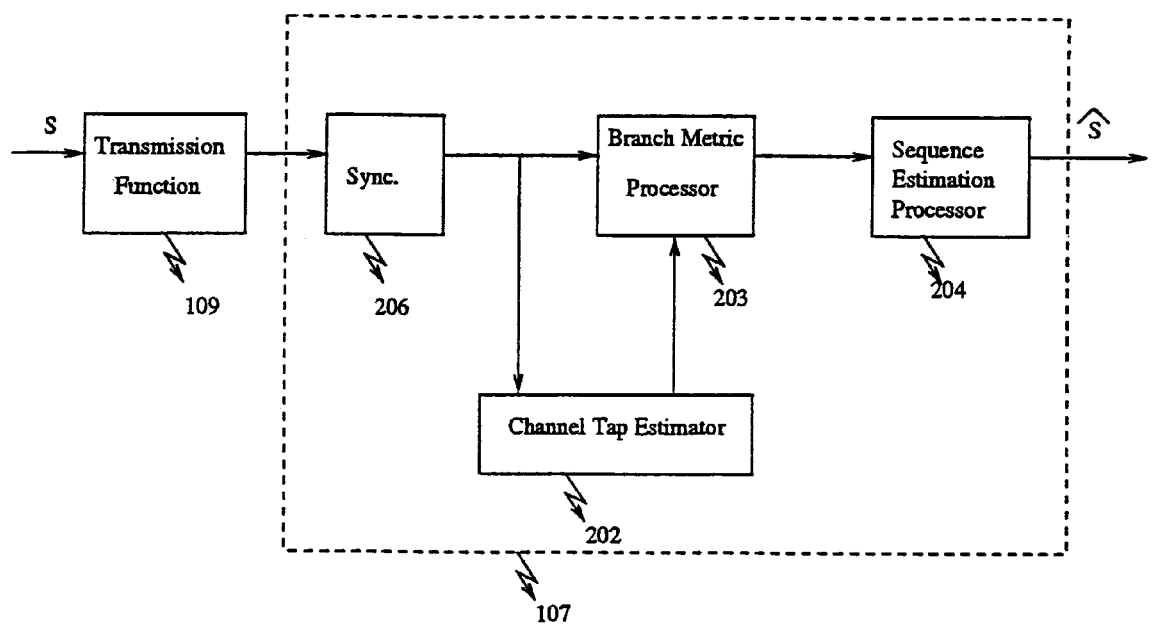
FIG. 2 illustrates a functional block diagram of the baseband processor of FIG. 1.

A functional block diagram of the baseband processing unit 107 is illustrated in FIG. 2. The received signal sample stream $r(kT_s)$ is coupled to a signal preprocessor, or sync, 206 where the received signal sample stream is correlated with a known timing/synchronization sequence according to known techniques. For the case of symbol-spaced demodulation, if the sample period $T_s$ is less than the symbol period T, the signal pre-processor 206 performs a decimation of the received signal sample stream $r(kT_s)$ to produce one sample per symbol, designated as $r(n)$. For fractionally-spaced demodulation, more than one sample per symbol is generated.

Estimating circuit 202 produces channel tap estimates $c(\tau)$ which are used to model the radio transmission channel according to known techniques. This might involve an initial channel estimation period followed by a tracking period. The channel tap estimates $c(\tau)$ are coupled to the input of the branch metric processor 203. The branch metric processor 203 is coupled to a sequence estimation processor 204 which provides an estimate of the digital symbol stream $\hat{S}$.

Figure 3:
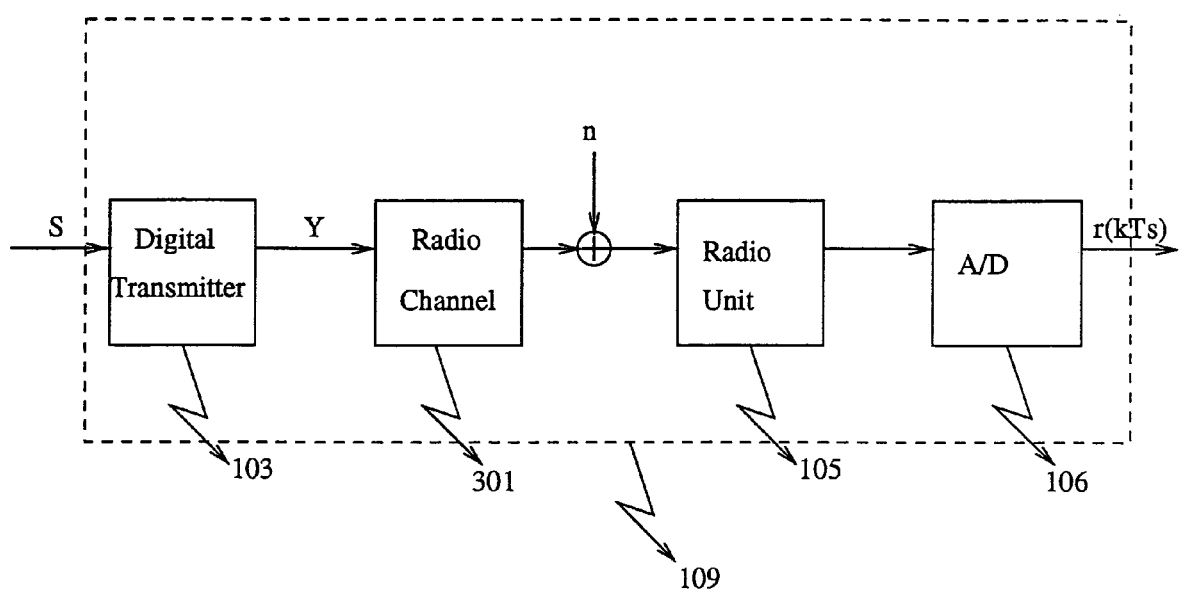
FIG. 3 illustrates a functional block diagram of the transmission function of FIG. 1.

The transmission function 109 is illustrated in more detail in FIG. 3, where for simplicity, the number of received antennas is restricted to one. One skilled in the art will appreciate that the present invention may also be used for the case where there are two or more antennas. In FIG. 3, the symbol sequence S is input to the digital transmitter 103 which transmits analog signal Y. The analog signal Y propagates through a radio transmission channel to the radio unit 105. Radio channel 301 may introduce fading and time dispersion. Omnipresent thermal noise n is also received. Radio unit 105 amplifies, down-converts, and filters the received signal according to known techniques to produce an analog signal. This analog signal is coupled to an A/D 106 which converts this analog signal into the received signal samples $r(kT_s)$.

In an MLSE equalizer, all possible transmitted symbol sequences S are effectively considered. In one implementation, hypothesized symbol values $s_h(n)$ are filtered by channel tap estimates $c(\tau)$ to produce hypothesized received samples $r_h(n)$. The difference between the hypothesized $r_h(n)$ and the actual $r(n)$ received signal sample stream, referred to as the hypothesis error $e(n)$, gives an indication of how good a particular hypothesis is. The squared magnitude of the hypothesis error is used as a metric to evaluate a particular hypothesis. The metric is accumulated for different hypotheses for use in determining which hypotheses are better using the sequence estimation algorithm. This process may be efficiently realized using the Viterbi algorithm. A description of the Viterbi algorithm can be found in G. Formey, Jr., "The Virterbi Algorithm," Proceedings of the IEEE, vol. 61, no. 3, March 1973, pp. 267–278. As will be appreciated by one skilled in the art, other sequence estimation algorithms may also be used.

In an MLSE equalizer, there are states associated with different transmitted sequence hypotheses $s_h(n)$. At a given iteration, there are previous states, each of which is associated with an accumulated metric. Each pairing of a previous state with a current state results in a branch metric $M_h(n)$. The candidate metric for a current state is then the sum of this branch metric $M_h(n)$ and the previously accumulated metric. For each current state, the previous state which gives the smallest candidate metric is selected as the predecessor state, and the smallest candidate metric becomes the accumulated metric for the current state. The branch metric can be expressed as:

$$M_h(n) = |r(n) - r_h(n)|^2 \quad (6)$$

where $$r_h(n) = \sum_{k=0}^{N_t - 1} c(k) s_h(n - k). \quad (7)$$

The channel tap estimates are designated by $c(\tau)$ where $\tau$ is the delay (i.e. $\tau=0$ is the main ray, $\tau=1$ is the first echo, etc). $N_t$ is the number of channel taps estimated. For each n, the hypothesized received signal $r_h(n)$ must be computed according to equation (7). In the most general case, computing each hypothesized received value $r_h(n)$ involves $N_t$ complex multiplications (i.e. $4N_t$ real multiplications). Each of these complex-valued multiplications involves the product of one of the estimated channel taps and a hypothesized transmitted signal.

Figure 4:
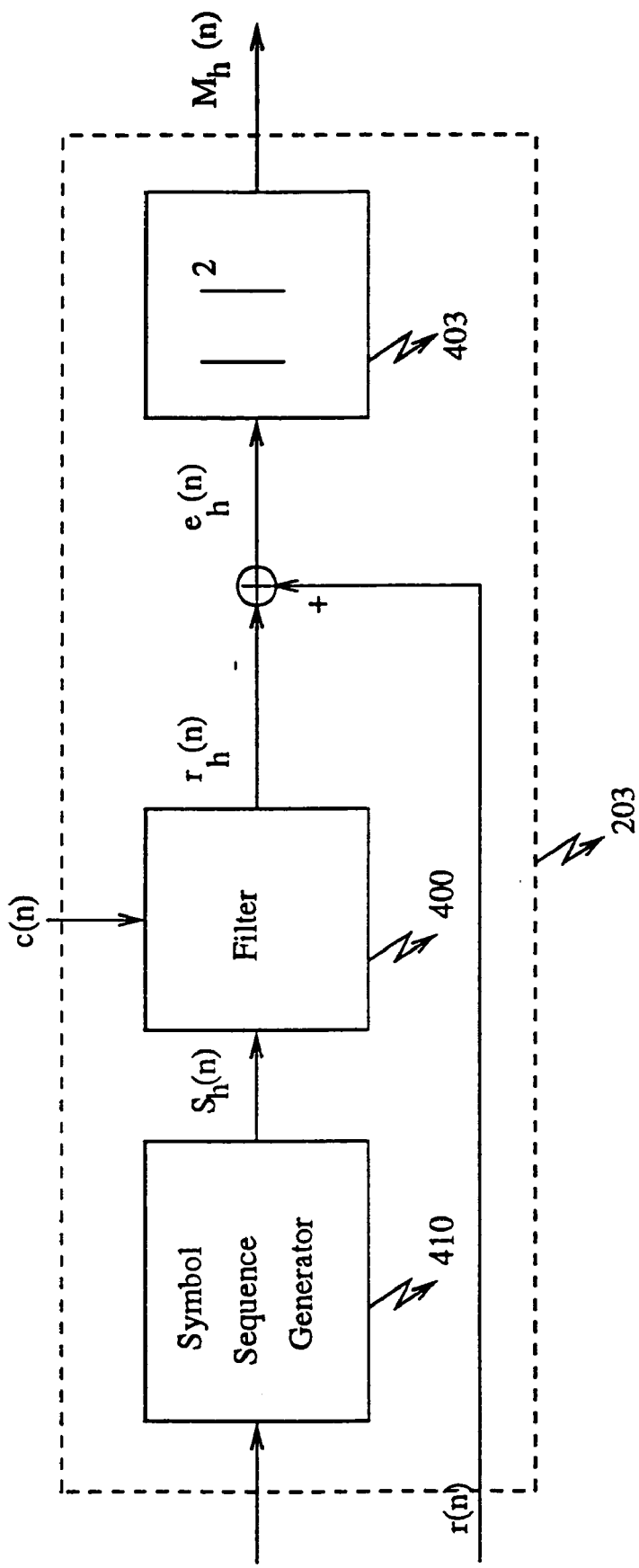
FIG. 4 illustrates a system for computing an Euclidean branch metric within which the techniques according to the instant invention may be implemented.

FIG. 4 illustrates a system for computing an Euclidean branch metric $M_h(n)$ within which the techniques according to the instant invention may be implemented. In FIG. 4, the hypothesized sequence of symbols $s_h(n)$ which is generated by symbol sequence generator 410 is coupled into filter 400 to produce the hypothesized received samples $r_h(n)$. The difference between the hypothesized received samples $r_h(n)$ and the actual received signal sample stream $r(n)$ is the hypothesized error $e(n)$. The squared magnitude of the hypothesized error is performed by unit 403 to produce the branch metric $M_h(n)$.

Figure 5:
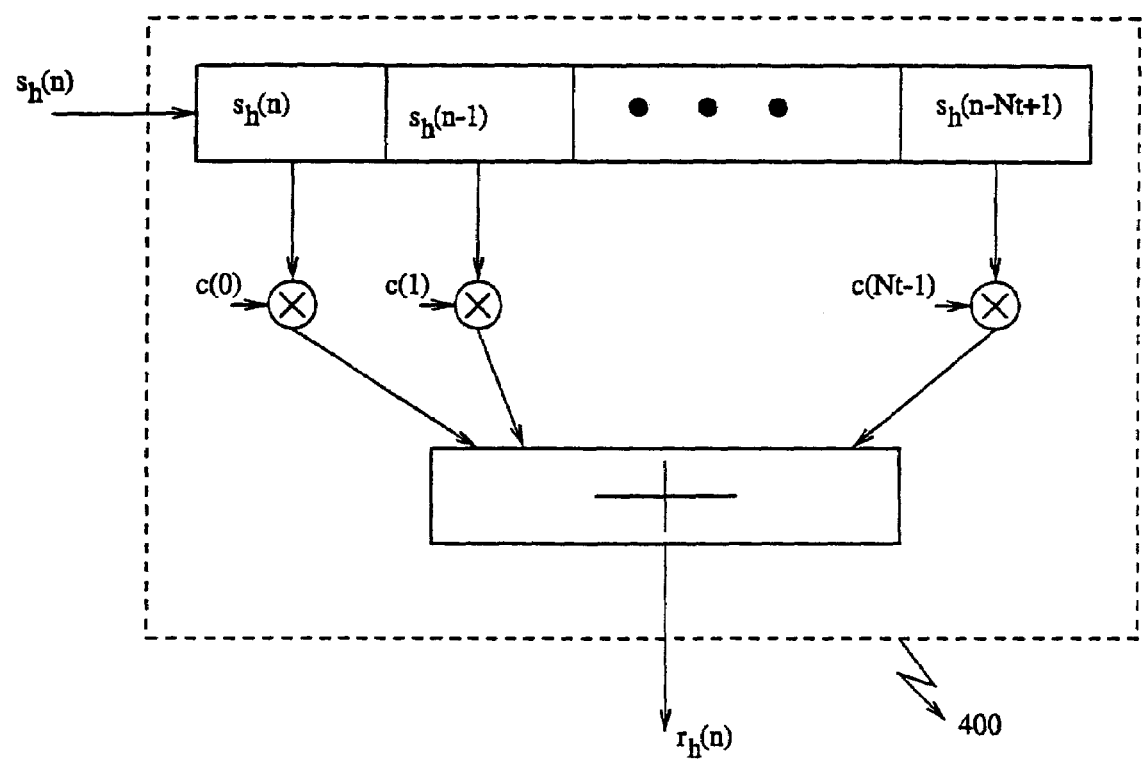
FIG. 5 illustrates a functional block diagram of a filter used to compute an Euclidean metric according to the prior art.

A functional block diagram of a conventional filter for computing an Euclidean branch metric is illustrated in FIG. 5. In FIG. 5, $N_t$ complex multiplications are performed to compute each $r_h(n)$. If the transmitted symbols are restricted to be in a set of M possible values, $\{B_1, B_2, \ldots, B_M\}$, the present invention provides a method for implementing the filter 400 that avoids performing any multiplications.

With an Euclidean metric, assume that each hypothesized transmitted symbol $s_h(n)$ is in the set $\{B_1, B_2, \ldots, B_M\}$. The first term in the sum in equation (7) is in the set $\{B_i c(0)\}_{i=1}^{M}$. All the members of this set can be pre-computed and stored in the first column of an $M \times N_t$ table (see FIG. 6).

Figure 7:
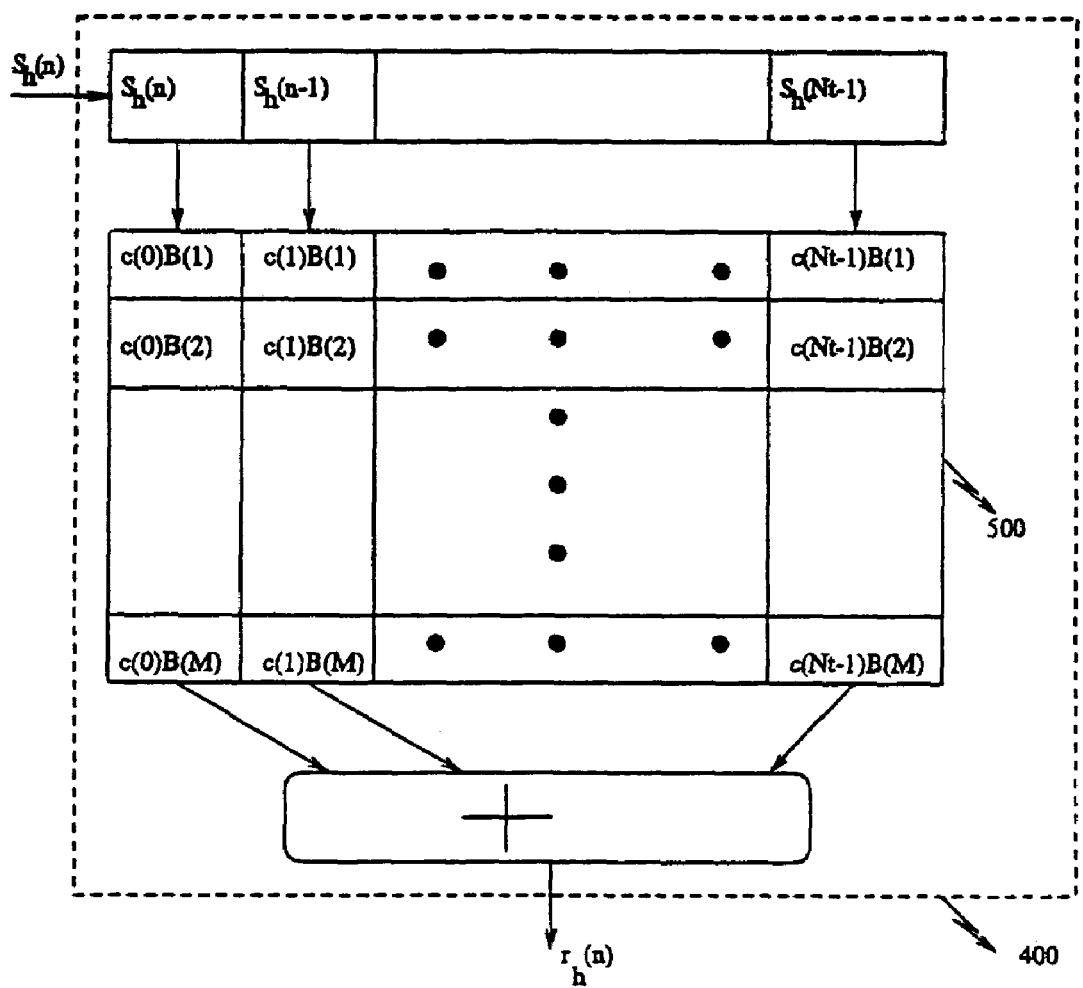
FIG. 7 illustrates a functional block diagram of the filter for computing the Euclidean metric according to one embodiment of the present invention.

The j-th column of this table, corresponding to estimated channel tap $c(j-1)$, stores all the possible values of $(s_h(.)c(j-1))$, i.e. $\{B_1 c(j-1), B_2 c(j-1), \ldots, B_M c(j-1)\}$. Each hypothesized received value $r_h(n)$ can then be computed by simply adding the appropriate entries from this product table (see FIG. 7).

As a concrete example, consider a two-tap channel $(c_0, c_1)$ with 8PSK modulation i.e., $s_h(n) \in$ $$\left\{ e^{j\frac{2\pi}{8} i} \right\}_{i=0}^{7}.$$

Figure 6:
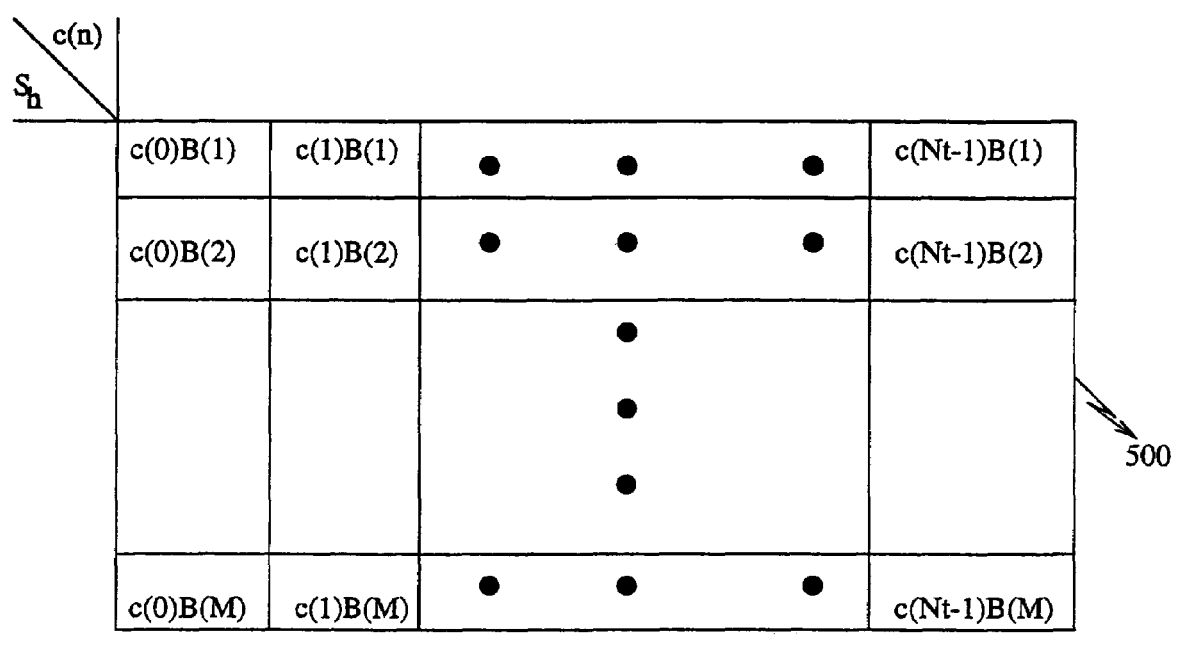

In this case, the first column of the table illustrated in FIG. 6 will have 8 entries, corresponding to channel tap $c_0$, as:

$$\left[ e^{j\frac{2\pi}{8} 0} c_0, \ e^{j\frac{2\pi}{8} 1} c_0, \ e^{j\frac{2\pi}{8} 2} c_0, \ \ldots, \ e^{j\frac{2\pi}{8} 7} c_0 \right]. \quad (8)$$

Similarly, the second column of the table in FIG. 6 will have 8 entries, corresponding to channel tap $c_1$, as:

$$\left[ e^{j\frac{2\pi}{8}0}c_1, e^{j\frac{2\pi}{8}}c_1, e^{j\frac{2\pi}{8}2}c_1, \ldots, e^{j\frac{2\pi}{8}7}c_1 \right]. \quad (9)$$

Symmetry can be used to reduce storage requirements. First, negative symmetry can be used to halve the items stored. Basically, $$e^{j\frac{2\pi}{8}l+\pi}c_0 = -e^{j\frac{2\pi}{8}l}c_0. \quad (10)$$

Therefore, only values for l=0, 1, 2, 3 need to be stored. Furthermore, $$e^{j\frac{2\pi}{8}2}c_0 = je^{j\frac{2\pi}{8}0}c_0 \quad (11)$$

and $$e^{j\frac{2\pi}{8}3}c_0 = je^{j\frac{2\pi}{8}(1)}c_0. \quad (12)$$

Thus, by switching real and imaginary parts and negating the new real part, one only needs to store values for l=0 and 1. For l=0, no multiplication is necessary since $$e^{j\frac{2\pi}{8}0}c_0 = c_0. \quad (13)$$

Thus, one can simply store $c_0$ and $e^{j\pi/4}c_0$ and derive the other values using logic that negates and possibly switches real and imaginary parts. This savings results from the quadrantile symmetry in the 8PSK signal constellation.

The Ungerboeck metric is obtained from the Euclidean metric $M_h(n)$ of equation (3) in two steps. The first step is to expand $M_h(n)$ to get $$M_h(n) = A(n) + B(n) + C(n) + D(n), \quad (14)$$

where $$A(n) = |r(n)|^2 \quad (15)$$

$$B(n) = -2Re\{r(n)c_0*s_h*(n)\} - 2Re\{r(n)c_1*s_h*(n-1)\} \quad (16)$$

$$C(n) = |c_0|^2|s_h(n)|^2 + |c_1|^2|s_h(n-1)|^2 \quad (17)$$

$$D(n) = 2Re\{c_0c_1*s_h(n)s_h*(n-1)\}. \quad (18)$$

The Ungerboeck method drops the term A(n), which is common to all hypotheses. The second step combines terms proportional to $s_h*(n)$ from different iterations. At iteration (n+1), the terms become:

$$B(n+1) = -2Re\{r(n+1)c_0*s_h*(n+1)\} - 2Re\{r(n+1)c_1*s_h*(n)\} \quad (19)$$

$$C(n+1) = |c_0|^2|s_h(n+1)|^2 + |c_1|^2|s_h(n)|^2 \quad (20)$$

$$D(n+1) = 2Re\{c_0c_1*s_h(n+1)s_h*(n)\}. \quad (21)$$

Thus, there are terms proportional to $s_h*(n)$ in both iterations. These terms can be combined by defining a new metric, $M_h'(n)$, as $$M_h'(n) = Re\{s_h*(n)[-2z(n) + q_0s_h(n) + q_0s_h(n-1)]\} \quad (22)$$

where $$z(n) = c_0*r(n) + c_1*r(n+1) \quad (23)$$

$$q_0 = |c_0|^2 + |c_1|^2 \quad (24)$$

$$q_1 = 2c_0c_1*. \quad (25)$$

Here, $q_0$ and $q_1$ are referred to as s-parameters.

Thus with an Ungerboeck metric, the branch metric $M_h'(n)$ is defined as:

$$M_h'(n) = Re\{s_h*(n)[-2z(n) + t_h(n)]\}, \quad (26)$$

where $$t_h(n) = \sum_{k=0}^{N_t-1} q(k)s_h(n-k). \quad (27)$$

Figure 8:
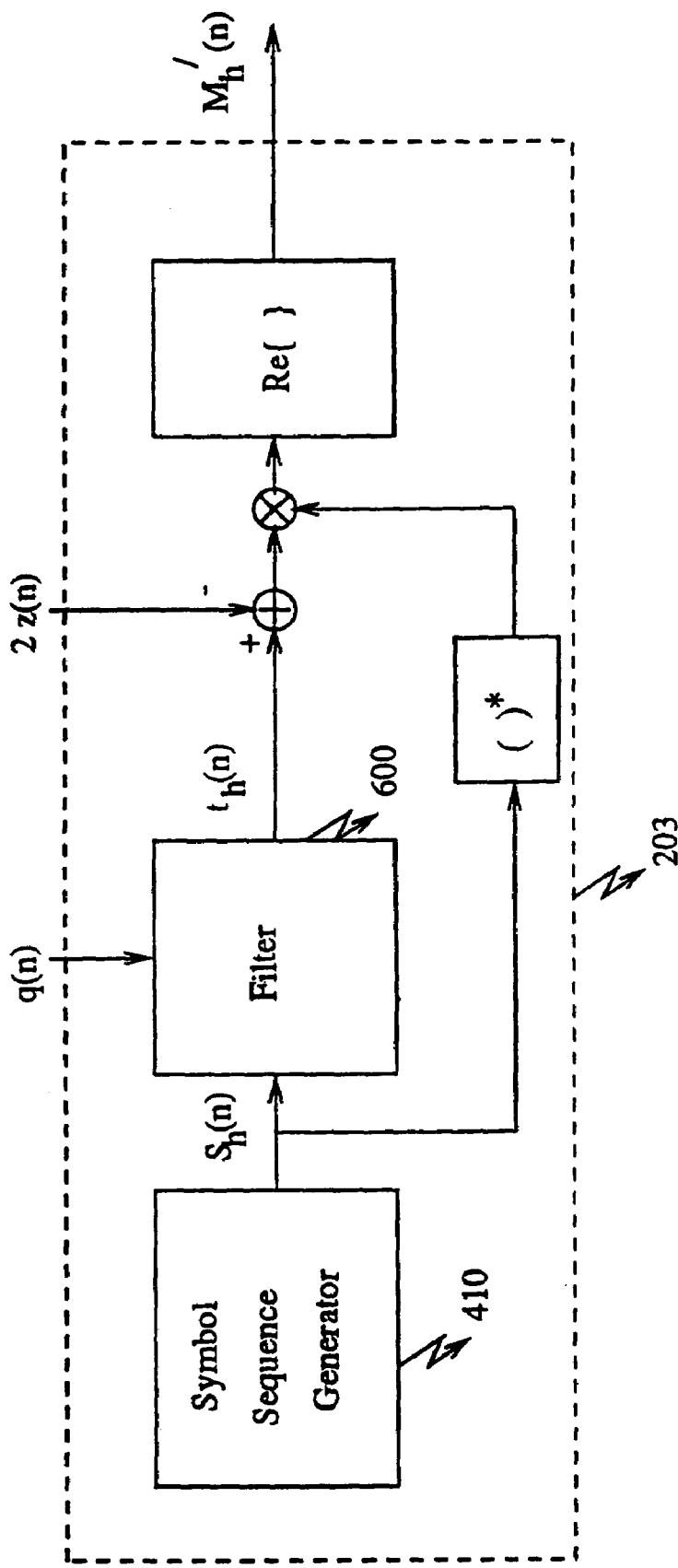
FIG. 8 illustrates a system for computing an Ungerboeck branch metric within which the techniques according to the instant invention may be implemented.
Figure 9:
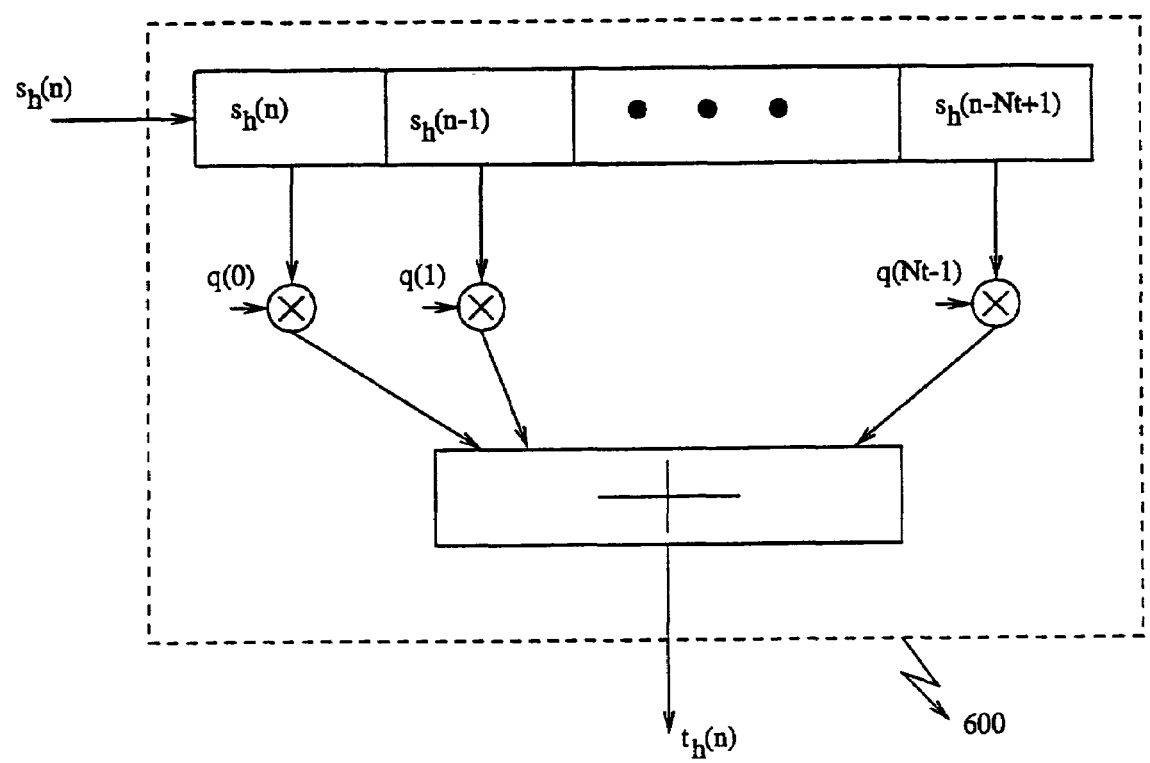
FIG. 9 illustrates a functional block diagram of a conventional filter used to compute the Ungerboeck metric according to the prior art.

FIG. 8 illustrates a system for computing an Ungerboeck branch metric within which the techniques according to the instant invention may be implemented. In FIG. 8, the hypothesized symbols $s_h(n)$ are coupled into the filter 600, with impulse response $q(\tau)$, to produce the $t_h(n)$. $q(\tau)$'s are determined from the estimated channel taps $c(\tau)$'s; hence, $q(\tau)$'s do not depend on the hypothesized symbols $s_h(n)$. The current state of the art for implementing a filter of FIG. 8 requires $N_t$ complex multiplications, as illustrated in FIG. 9.

Figure 10:
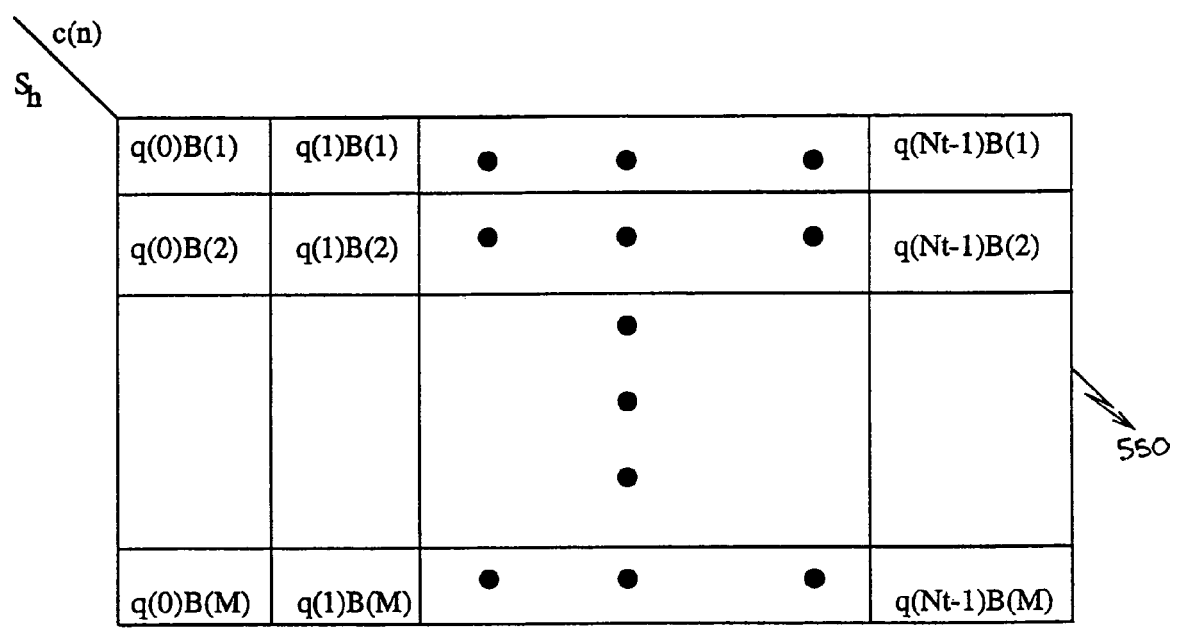

Assume that each hypothesized transmitted symbol $s_h(n)$ is in the set $\{B_1, B_2, \ldots, B_M\}$. The first term in the sum in equation (27) is in the set $\{B_iq(0)\}_{i=1}^M$. All the members of this set can be pre-computed and stored in the first column of an M×$N_t$ table (see FIG. 10).

Figure 11:
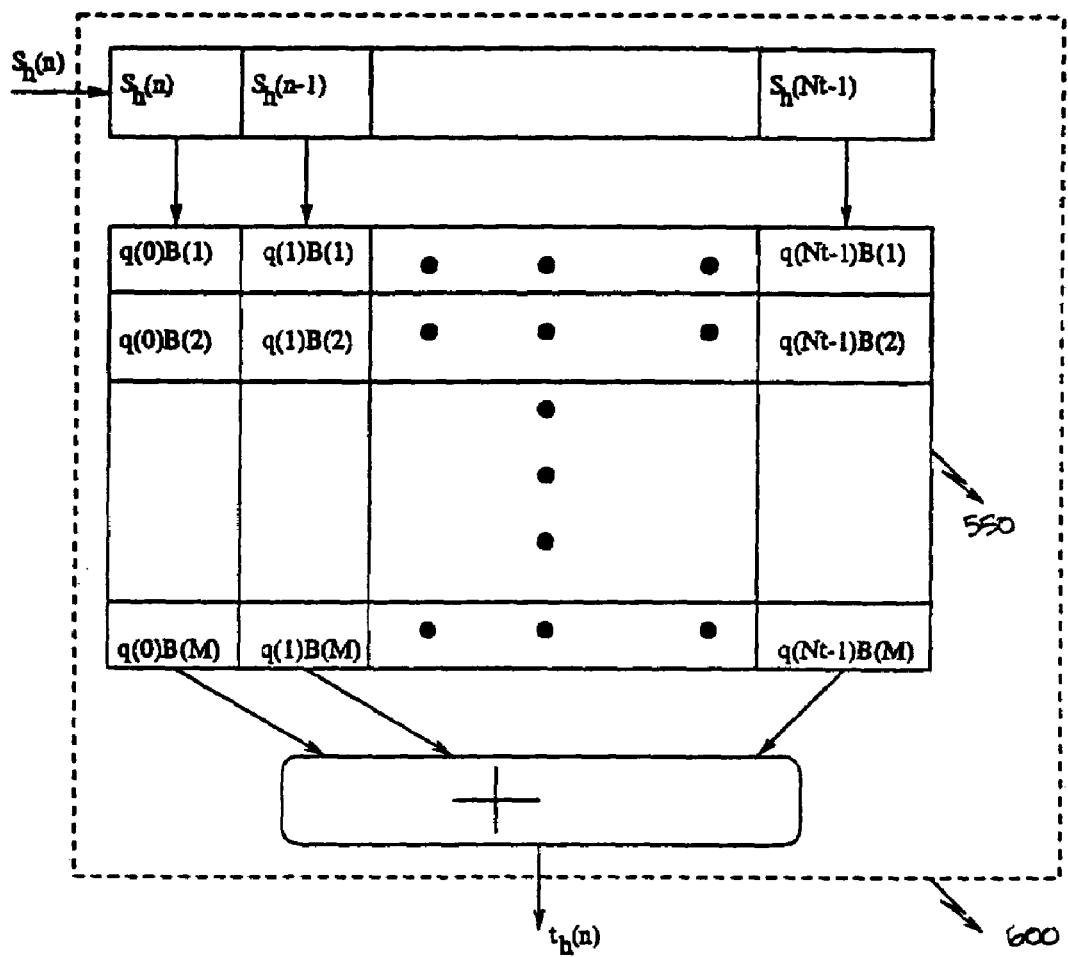
FIG. 11 illustrates a functional block diagram of the filter for computing the Ungerboeck metric according to one embodiment of the present invention.

The j-th column of this table, corresponding to q(j−1), stores all the possible values of $s_h(.)q(j-1)$, i.e., $\{B_1q(j-1), B_2q(j-1), \ldots, B_Mq(j-1)\}$. Each hypothesized $t_h(n)$ can then be computed by simply adding the appropriate entries from this product table (see FIG. 11).

As described earlier, quadrantile symmetry can be used to reduce the number of items stored in each column to two.

The partial Ungerboeck metric also has terms like $q_i$ set forth in the previous section; hence, the present invention can be used to reduce the number of multiplications needed to implement a demodulator that uses the partial Ungerboeck metric. The partial Ungerboeck metric is disclosed in U.S. Pat. No. 5,499,272 to Bottomley.

For a multi-channel MLSE with Euclidean metric, the transmitted symbol stream is received via several channels. With two channels, there would be two received signals $r_a(n)$ and $r_b(n)$, corresponding to channels a and b respectively:

$$r_a(n) = c_{a0}s(n) + c_{a1}s(n-1) + \eta_a(n) \quad (28)$$

$$r_b(n) = c_{b0}s(n) + c_{b1}s(n-1) + \eta_b(n). \quad (29)$$

Corresponding to each received signal and each hypothesized symbol sequence, there would be a branch error signal:

$$e_{ah}(n) = r_a(n) - r_{ah}(n) \quad (30)$$

$$e_{bh}(n) = r_b(n) - r_{bh}(n), \quad (31)$$

where $r_{ah}(n)$ and $r_{bh}(n)$ are the hypothesized received signals for channel a and channel b (both corresponding to the same hypothesized sequence $\{s_h(n-1), s_h(n-1)\}$:

$$r_{ah}(n) = c_{a0}s_h(n) + C_{a1}s_h(n-1) \quad (32)$$

$$r_{bh}(n) = c_{b0}s_h(n) + c_{b1}s_h(n-1). \tag{33}$$

Note that one branch metric for channel a is $e_{ah}(n)e^*_{ah}(n)$, and one branch metric for channel b is $e_{bh}(n)e^*_{bh}(n)$.

Different branch metrics for the joint equalization of the outputs of both channels can be obtained by combining $e_{ah}(n)$ and $e_{bh}(n)$ in different ways. Several interesting branch metrics for the joint equalization problem can be expressed in the following form:

$$M_h(n) = E_h(n)^H Q E_h(n), \tag{34}$$

where $$E_h(n) = \begin{bmatrix} e_{ah}(n) \\ e_{bh}(n) \end{bmatrix} \tag{35}$$

and Q is a two by two weighting matrix.

Any branch metric of the form given by equation (34) can be computed efficiently using two pre-computed tables. Each hypothesized received signal $r_{ah}(n)$ or $r_{bh}(n)$ can be computed without performing a multiplication operation by using two pre-computed tables.

It would be appreciated by one skilled in the art how the present invention can be used when more than two channels are received. Similarly, it would be appreciated by one skilled in the art how the present invention can be used when the symbols can take on one of M possible values.

In metric combining, the weighting matrix Q is a diagonal matrix. The diagonal entries of this matrix are the weighting coefficients for each channel.

In Interference Rejection Combining (IRC), the weighting matrix Q is the inverse of the correlation matrix of the impairment. Specifically, the impairment vector i(n) may be defined as $$i(n) = \begin{bmatrix} \eta_a(n) \\ \eta_b(n) \end{bmatrix}, \tag{36}$$

and let $R_{\eta\eta} = E\{i(n)i(n)^H\}$. In IRC, the weighting matrix Q is simply $Q = R_{\eta\eta}^{-1}$. IRC is described more fully in U.S. Pat. No. 5,680,419 which is incorporated by reference herein.

For a multi-channel MLSE with Ungerboeck metric, consider the case with two channels; hence, for each "n" there would be two received samples $r_a(n)$ and $r_b(n)$ as given by equations (28)–(29).

In this case, the Ungerboeck branch metric is given by:

$$M_h'(n) = Re\{s_h^*(n)[-2z(n) + q_0 s_h(n) + q_1 s_h(n-1)]\} \tag{37}$$

where z(n) is obtained from both received signals and both channel taps, and ($q_0$, $q_1$) are obtained from both channel taps and the inverse of the impairment's correlation matrix (see U.S. Pat. No. 5,680,419). It is important to note that ($q_0$, $q_1$) do not depend on the hypothesized symbols and are fixed.

From equation (37), it is evident that computing $M_h'(n)$ in the multi-channel case requires computing $$t_h(n) = q_0 s_h(n) + q_1 s_h(n-1). \tag{38}$$

Computing $t_h(n)$ would normally require two multiplications. These multiplications can be avoided by pre-computing the values $\{sq_0, sq_1\}$ for possible symbol values s and storing them in a table in memory. Any hypothetical $t_h$ can then be computed by adding the appropriate entries from this pre-computed table.

It would be appreciated by one skilled in the art how the present invention can be used when more than two channels are received. Similarly, it would be appreciated by one skilled in the art how the present invention can be used when the symbols can take on one of M possible values.

For the case of fractionally-spaced MLSE equalization, a (T/2) fractionally-spaced MLSE equalizer will receive two samples in each sampling interval of length T. Let $r_a(n)$ represent the even samples of the received signal, and let $r_b(n)$ represent the odd samples of the received signal. Note the $r_a(n)$ and $r_b(n)$ are symbol-spaced. In a particular implementation of the fractionally-spaced MLSE equalizer, $r_a(n)$ and $r_b(n)$ are treated as two separate received signals (resulting from the same transmitted symbol stream). According to this exemplary embodiment, the two-input MLSE equalizer of the last section is used to detect the transmitted symbol stream. The techniques disclosed above for reducing the complexity of the diversity of the MLSE equalizer are obviously applicable to this implementation of the fractionally-spaced MLSE equalizer.

It would be appreciated by one skilled in the art how the present invention can be used with other forms of fractionally-spaced equalization. For example, in one particular realization of the fractionally-spaced equalizer, a pre-whitening filter is applied to each sub-sampled sequence (see Hamied and Stuber, "A Fractionally Spaced MLSE Receiver," IEEE 1995). This particular formulation is very similar to metric combining. In yet another formulation of the fractionally-spaced equalizer, an Ungerboeck metric is used; hence, the present invention can again be used to reduce the complexity of this equalizer. It would also be appreciated by one skilled in the art how the present invention can be used when more than two samples are received per symbol.

For a MLSE with a time-varying channel, at each iteration, a different set of channel taps might be considered. With the Euclidean metric, the hypothesized received signal is expressed as:

$$r_h(n) = c_0(n)s_h(n) + c_1(n)s_h(n-1) \tag{39}$$

In this case, at iteration "n", the table might be updated and used for computing all the different hypothesized received values at this iteration. A new table is computed for iteration "n+1" and so forth.

It would be appreciated by one skilled in the art how the present invention can be used when the Ungerboeck metric is used with a time-varying channel. The table would be updated every time the $q_i$'s are updated.

For demodulation of signals modulated using offset M-ary modulation, the present invention can be modified to reduce the complexity of the demodulator even further. In offset M-ary modulation, the transmitted symbols for even "n" are purely real, and the transmitted symbols for odd "n" are purely imaginary:

$$s(n) = j^n B_i \, i \in \{1, \ldots, M\}, \tag{40}$$

where each $B_i$ is purely real. Hence, $s_h(n)$ can take one of 2M values $\{B_i, jB_i\}_{i=1}^M$.

However, by pre-rotating the received signal r(n) by $j^{-n}$ we can reduce the demodulation problem to demodulating purely real symbols where each real symbol is in the set $\{B_i\}_{i=1}^M$. With this pre-rotation, we would only need to store the product of the channels taps and each of $\{B_i\}_{i=1}^M$'s.

It will be apparent to one of ordinary skill in the art that the present invention may be practiced in other embodiments that depart from these specific details. In other instances, detailed description of well-known methods, devices, and circuits are omitted so as not to obscure the description of the present invention with unnecessary details.

Many variants and combinations of the techniques taught above may be devised by a person skilled in the art without departing from the spirit or scope of the invention as described by the following claims.

What is claimed is:

1. In a receiver, a method for demodulating an M-ary modulated information signal received on at least one receive antenna, said method comprising the steps of:
   estimating at least one channel coefficient associated with the M-ary modulated information signal to produce at least one channel estimate;
   pre-computing multiplication product values for a set of transmitted symbol values and a complex number, wherein the complex number comprises s-parameters in an Ungerboeck branch metric and depends on said at least one channel estimate;
   storing the pre-computed multiplication product values in a product look-up table; and
   determining branch metrics in a nonlinear maximum-likelihood sequence-estimation equalizer through repeated use of the pre-computed multiplication product values to demodulate the received M-ary modulated information signal.

2. The method of claim 1 wherein the set of transmitted symbol values comprises all M possible symbol values.

3. The method of claim 1 wherein the set of transmitted symbol values comprises a subset of the M possible symbol values.

4. The method of claim 1 wherein the complex number comprises the channel estimate.

5. In a receiver, a nonlinear maximum-likelihood sequence-estimation equalizer for demodulating an M-ary modulated information signal received on at least one receive antenna, the nonlinear maximum-likelihood sequence-estimation equalizer comprising:
   a channel coefficient estimator for producing least one channel estimate associated with the M-ary modulated information signal;
   a memory for storing a product look-up table having pre-computed multiplication product values equal to the product of a set of transmitted symbol values and a complex number, wherein the complex number comprises s-parameters in an Ungerboeck branch metric and depends on the at least one channel estimate; and
   a branch metric computer for determining branch metrics through repeated use of the pre-computed multiplication product values to demodulate the received M-ary modulated information signal.

6. The nonlinear maximum-likelihood sequence-estimation equalizer of claim 5 wherein the set of transmitted symbol values comprises all M possible symbol values.

7. The nonlinear maximum-likelihood sequence-estimation equalizer of claim 5 wherein the set of transmitted symbol values comprises a subset of the M possible symbol values.

8. The nonlinear maximum-likelihood sequence-estimation equalizer of claim 5 wherein the complex number comprises the channel estimate.

9. In a receiver, a nonlinear maximum-likelihood sequence-estimation equalizer for demodulating an M-ary modulated information signal received on at least one receive antenna, the nonlinear maximum-likelihood sequence-estimation equalizer comprising:
   means for producing least one channel estimate associated with the M-ary modulated information signal;
   means for storing a product look-up table having pre-computed multiplication product values equal to the product of a set of transmitted symbol values and a complex number, wherein the complex number comprises s-parameters in an Ungerboeck branch metric and depends on the at least one channel estimate; and
   means for determining branch metrics through repeated use of the pre-computed multiplication product values to demodulate the received M-ary modulated information signal.

10. The nonlinear maximum-likelihood sequence-estimation equalizer of claim 9 wherein the set of transmitted symbol values comprises all M possible symbol values.

11. The nonlinear maximum-likelihood sequence-estimation equalizer of claim 9 wherein the set of transmitted symbol values comprises a subset of the M possible symbol values.

12. The nonlinear maximum-likelihood sequence-estimation equalizer of claim 9 wherein the complex number comprises the channel estimate.

* * * * *